E. H. MUELLER.
AUTOMOBILE HEADLIGHT.
APPLICATION FILED APR. 12, 1920.

1,416,375.

Patented May 16, 1922.

Inventor:
Edward H. Mueller

Witness:
Robert Weber

By Young & Young,
Attorneys

UNITED STATES PATENT OFFICE.

EDWARD H. MUELLER, OF HARTFORD, WISCONSIN.

AUTOMOBILE HEADLIGHT.

1,416,375.  Specification of Letters Patent.  Patented May 16, 1922.

Application filed April 12, 1920. Serial No. 373,299.

*To all whom it may concern:*

Be it known that I, EDWARD H. MUELLER, a citizen of the United States, and resident of Hartford, in the county of Washington and State of Wisconsin, have invented certain new and useful Improvements in Automobile Headlights; and I do hereby declare that the following is a full, clear, and exact description thereof.

My invention relates to new and useful improvements in vehicle headlights, and pertains particularly to those used on automobiles and similar motor vehicles.

Much experimentation has been made with various forms of headlights in an endeavor to obtain an ideal light for use on automobiles and motor vehicles generally which will not blind or dazzle approaching pedestrians or the driver of an on coming machine. The usual method of overcoming this difficulty is to provide translucent lenses or other lenses which break up and thoroughly diffuse the light rays. However, this as well as most other methods destroys a great proportion of the efficiency of the lamp.

It is therefore the primary object of the present invention to provide an arrangement whereby the light efficiency is not impaired, while the light rays are so directed that they will have no blinding or dazzling effect.

An additional object of the invention is to provide a lamp of this character which will have means for directing the rays of light as desired by the operator.

With these general objects in view the invention resides in the novel features of construction, combination and arrangement of parts which will be hereinafter more particularly described and claimed.

Figure 1:
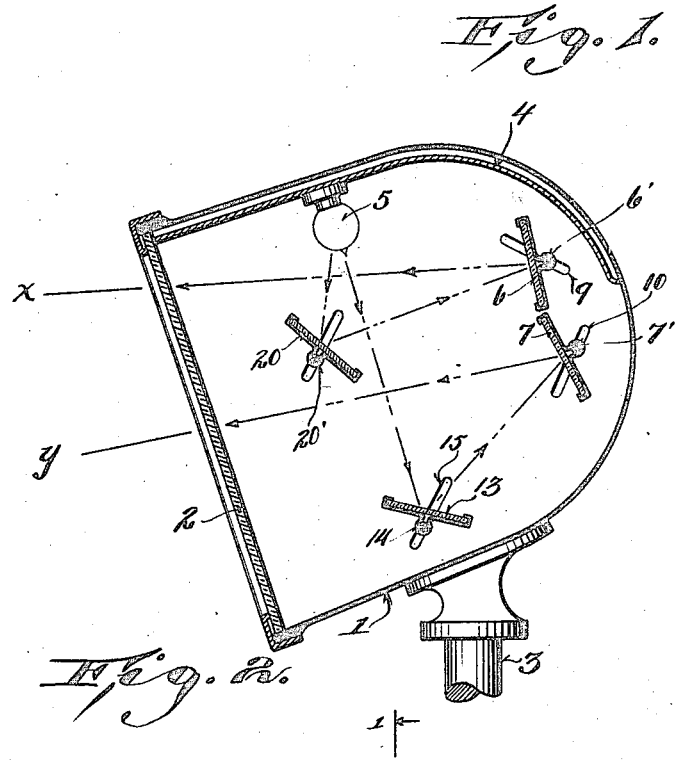
Figure 2:
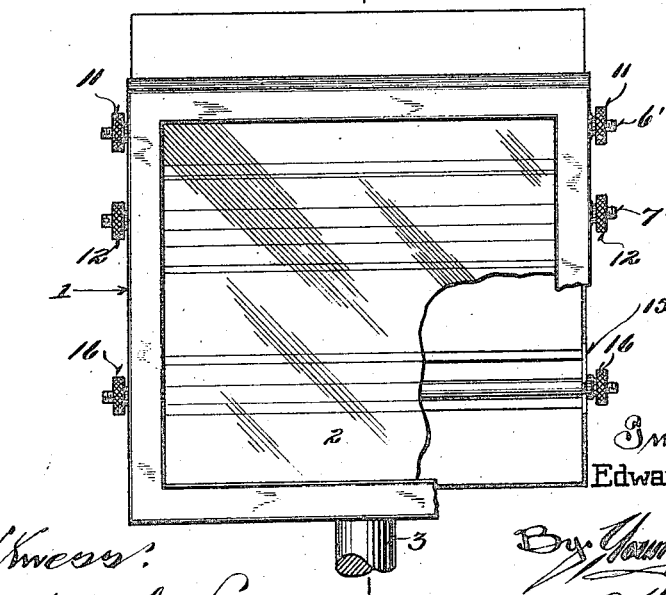

In the accompanying drawing:

Figure 1 represents a vertical sectional view through a headlight constructed in accordance with my invention, said section being taken on the plane of the line 1—1 of Figure 2, and Figure 2 is a front elevational view of the lamp shown in Figure 1.

Referring more particularly to the drawing, it will be seen that as is customary in structures of this character, my improved headlight includes a case 1 having a transparent glass-plate 2 and supported upon a suitable bracket standard 3. In so far as the present invention is concerned the case may be of any desired size or shape, but is preferably so constructed as to conceal an electric lamp 5 from direct vision through the glass-plate 2. In carrying this out the outer portion of the case may be domed, or the entire case inclined as is shown in the drawing. The upper portion, that is to say substantially the upper one-half of the case 1 is provided with a reflector plate 4 for directing the light rays downwardly, and inasmuch as the lamp 5 is hidden as above mentioned, the rays therefrom will be thrown by the plate 4 downwardly in front of the case 1 and only a short distance in front of the automobile or other vehicle on which the headlight is mounted.

Additional means is provided within the case for directing portions of the light rays at a further distance in front of the vehicle than is possible by use of the reflector plate 4 alone. Such means includes a reflector mirror in the form of an elongated plate 7 held in a suitable frame and pivotally mounted by means of a pivot rod 7', and a deflector mirror 13 also in the form of an elongated plate pivotally supported by a rod 14. The opposite side walls of the case 1 are provided with slots 10 and 15 in which the opposite ends of the pivot rods 7' and 14 are respectively rotated and slidably mounted. In the present embodiment of the invention the pivot rods 7' and 14 are provided at their opposite ends with clamp nuts, those of the latter being designated by the numeral 16. By such an arrangement the plates 7 and 13 may be adjusted at the will of the operator and held in this position, and any other preferred or desired means may be used for holding the plates 7 and 13 stationary after once having been adjusted.

In use the reflector mirror 7 is inclined forwardly at any convenient angle, but is always disposed at other than a right angle. On the other hand the deflector mirror 13 is positioned more nearly horizontal and its purpose is to receive the rays of light from the lamp 5 and deflect them to the mirror 7 from which they are reflected along the line $y$ as shown in Figure 1.

With the reflector mirror held stationary, the light rays designated by the line $y$ may be thrown to any desired angle by tilting the deflector mirror 13. However, they are always disposed below the horizontal so as to prevent blinding or dazzling of persons approaching the vehicle carrying the headlights.

These mirrors 7 and 13 are preferably positioned toward the rear and bottom of the case 1 so that if desired similar means may be located thereabove to direct a second or third series of light rays from the case to strike the ground in front of the vehicle at different points. Such a second light distributing means may be formed of a reflecting mirror 6 and a deflecting mirror 20, the former of which is provided with a pivot rod 6' and the latter with a similar rod 20'. The ends of the rod 6' are disposed in slots 9 and locked to the walls of the hood 1 by nuts 11. The deflector mirror 20 is secured in adjusted positions by nuts 12. The mirror 20 receives the rays of light from the lamp 5 and deflects them to the mirror 6 from which they are reflected on the line $x$.

Regardless of the number of light distributing means within the case 1, each of them operates in the same manner and throws the rays of light through the glass-plate 2 at different angles below the horizontal. Also the direction of the light rays is controlled entirely through the position of the deflector mirrors 13 and 20 irrespective of the position of the mirrors 6 and 7. The last mentioned mirrors, however, are always inclined forwardly and never positioned vertically as there would thus be a tendency to throw the light rays horizontally of the case as in the case of an ordinary head light. In other words in this invention it is desired to avoid the detrimental feature of ordinary headlights having deflectors extending around the entire wall of the case and in which there is necessarily a point where light rays will be projected on a horizontal line so as to produce a blinding effect on approaching persons unless a translucent or other modified form of lens is used.

I claim:

A head light comprising a casing having its front inclined downwardly, a lamp mounted within the casing above the horizontal line of vision with respect to the inclined edge thereof, a pair of spaced mirrors mounted in the casing below the lamp at predetermined angles to reflect the rays of light from said lamp rearwardly, and a pair of mirrors mounted in the rearward portion of the casing at predetermined angles to reflect the rays of light from the first mentioned pair of mirrors forwardly.

In testimony that I claim the foregoing I have hereunto set my hand at Milwaukee, in the county of Milwaukee and State of Wisconsin.

EDWARD H. MUELLER.